(12) United States Patent
Acero et al.

(10) Patent No.: US 7,571,097 B2
(45) Date of Patent: Aug. 4, 2009

(54) METHOD FOR TRAINING OF SUBSPACE CODED GAUSSIAN MODELS

(75) Inventors: Alejandro Acero, Bellevue, WA (US); Michael D. Plumpe, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 10/388,260

(22) Filed: Mar. 13, 2003

(65) Prior Publication Data

US 2004/0181408 A1 Sep. 16, 2004

(51) Int. Cl.
*G10L 15/14* (2006.01)
*G10L 15/06* (2006.01)

(52) U.S. Cl. .................... 704/256.7; 704/245

(58) Field of Classification Search ............... 704/245, 704/256.7
See application file for complete search history.

(56) References Cited

U.S. PATENT DOCUMENTS

| | | | | |
|---|---|---|---|---|
| 5,182,773 | A | * | 1/1993 | Bahl et al. ............. 704/222 |
| 5,271,088 | A | * | 12/1993 | Bahler ................... 704/200 |
| 5,793,891 | A | * | 8/1998 | Takahashi et al. ........ 382/228 |
| 5,839,105 | A | * | 11/1998 | Ostendorf et al. ........ 704/256 |
| 5,857,169 | A | * | 1/1999 | Seide .................. 704/256.7 |
| 5,878,388 | A | * | 3/1999 | Nishiguchi et al. ........ 704/214 |
| 5,960,388 | A | * | 9/1999 | Nishiguchi et al. ........ 704/208 |
| 6,141,641 | A | | 10/2000 | Hwang et al. ............ 704/243 |
| 6,317,712 | B1 | * | 11/2001 | Kao et al. .............. 704/256.3 |
| 6,526,379 | B1 | * | 2/2003 | Rigazio et al. ........... 704/245 |
| 6,687,336 | B1 | * | 2/2004 | Holeys ................. 379/1.04 |
| 6,931,351 | B2 | * | 8/2005 | Verma et al. ............ 702/182 |
| 7,072,795 | B2 | * | 7/2006 | Haft et al. .............. 702/181 |

OTHER PUBLICATIONS

Kenneth Rose, "Deterministic Annealing for Clustering, Compression, Classification, Regression, and Related Optimization Problems", IEEE, 1998.*

Luca Rigazio, Brice Tsakam, Jean-Claude Junqua, "An Optimal Bhattacharyya Centroid Algorithm for Gaussian Clustering with Applications in Automatic Speech Recognition", IEEE, 2000.*

Pedro Moreno, Bhiksha Raj, Evandro Gouvea, Richard Stern, "Multivariate-Gaussian-Based Cepstral Normalization for Robust Speech Recognition", IEEE 1995.*

Foote et al., "A Model Distance Measure For Talker Clustering and Identification", pp. 1-4, IEEE 1994.

Mak et al., "Stream Derivation and Clustering Scheme for Subspace Distribution Clustering Hidden Markov Model", pp. 339-346, IEEE 1997.

Bocchieri et al., "Subspace Distribution Clustering Hidden Markov Model", pp. 264-275, IEEE Transaction on Speech and Audio Processing, vol. 9, No. 3, Mar. 2001.

(Continued)

*Primary Examiner*—Richemond Dorvil
*Assistant Examiner*—Eric Yen
(74) *Attorney, Agent, or Firm*—Steven M. Koehler; Westman, Champlin & Kelly, P.A.

(57) ABSTRACT

A method for compressing multiple dimensional gaussian distributions with diagonal covariance matrixes includes clustering a plurality of gaussian distributions in a multiplicity of clusters for each dimension. Each cluster can be represented by a centroid having a mean and a variance. A total decrease in likelihood of a training dataset is minimized for the representation of the plurality of gaussian distributions.

34 Claims, 18 Drawing Sheets

OTHER PUBLICATIONS

Boulis, "Clustering of Cepstrum Coefficients Using Pairwise Mutual Information", Technical Report EE516, Electrical Engineering Dept. University of Washington, Seattle, 2002.

Axelrod et al., "Dimensional Reduction, Covariance Modeling, and Computational Complexity in ASR Systems", ICASSP 2003.

Communication and European Search Report EP04006013.9, dated Oct. 18, 2004.

Enrico Bocchieri, et al. Subspace Distribution Clustering, Hidden Markov Model, IEEE Transactions on Speech and Audio Processing, vol. 9, No. 3, Mar. 2001.

Enrico Bocchieri, et al., State Tying of Triphone HMM's For The 1994 AT&T ATIS Recognizer, ESCA. EUROSPEECH '95 4$^{th}$ European Conference on Speech Communication and Technology. Madrid, Sep. 1995. ISSN 1018-4074.

Satoshi Takahashi, et al.,Four-Level Tied-Structure For Efficient Representation of Acoustic Modeling, 1995 IEEE.

A. Kannan, et al., Maximum Likelihood Clustering of Gaussians for Speech Recognition, 1994 IEEE.

R. Haeb-Umbach, et al., Speech Recognition Algorithms For Voice Control Interfaces, Philips Journal of Research, vol. 49, No. 4, 1995.

Communication from the European Patent Office in counterpart foreign application No. 04006013.9 filed Mar. 12, 2004.

Official Search Report of the European Patent Office in counterpart foreign application No. 06025047.9 filed Mar. 12, 2004.

* cited by examiner

|   | 0 | 1 | 2 | 3 | ... | 32 |
|---|---|---|---|---|---|---|
| 0 | $\Sigma S_{dT0,0}$ | | | | | |
| 1 | $\Sigma S_{dT1,0}$ | $\Sigma S_{dT1,1}$ | $\Sigma S_{dT1,2}$ | | | |
| 2 | | | $\Sigma S_{dT2,2}$ | | | |
| 3 | | | | $\Sigma S_{dT3,3}$ | | |
| ⋮ | | | | | | |
| 32 | $\Sigma S_{dT32,0}$ | | | | | $\Sigma S_{dT32,32}$ |

FIG. 6

| 0 | 1 | 2 | 3 | 4 | 5 | 6 | 7 | 8 | 9 | 10 | 11 | 12 |
|---|---|---|---|---|---|---|---|---|---|----|----|----|
| 13 | 14 | 15 | 16 | 17 | 18 | 19 | 20 | 21 | 22 | 23 | 24 | 25 |
| 26 | 27 | 28 | 29 | 30 | 31 | 32 | | | | | | |

FIG. 7A

| 0 | 1 | 2 | 3 | 4 | 5 | 6 | 7 | 8 | 9 | 10 | 11 | 12 |
|---|---|---|---|---|---|---|---|---|---|----|----|----|
| 13 | 14 | 15 | 16 | 17 | 18 | 19 | 20 | 21 | 22 | (23 | 24 | 25) |
| 26 | 27 | 28 | 29 | 30 | 31 | 32 | | | | | | |

FIG. 7B

|  0 |  1 |  2 |  3 |  4 |  5 |  6 |  7 |  8 |  9 | 10 | (11 | 12) |
|---|---|---|---|---|---|---|---|---|---|---|---|---|
| 13 | 14 | 15 | 16 | 17 | 18 | 19 | 20 | 21 | 22 | (23 | 24 | 25) |
| 26 | 27 | 28 | 29 | 30 | 31 | 32 |

FIG. 7C

|  0 |  1 |  2 |  3 |  4 |  5 |  6 |  7 |  8 | (9 | 10) | (11 | 12) |
|---|---|---|---|---|---|---|---|---|---|---|---|---|
| 13 | 14 | 15 | 16 | 17 | 18 | 19 | 20 | 21 | 22 | (23 | 24 | 25) |
| 26 | 27 | 28 | 29 | 30 | 31 | 32 |

FIG. 7D

METHOD FOR TRAINING OF SUBSPACE CODED GAUSSIAN MODELS

BACKGROUND OF THE INVENTION

The present invention relates to classifiers used in computer processing. More particularly, the present invention relates to compression of gaussian models used in computer processing such as used in speech recognition.

A speech recognition system receives a speech signal and attempts to decode the speech signal to identify a string of words represented by the speech signal. Conventional speech recognizers include, among other things, an acoustic model and a language model formed usually from training data. The acoustic model models the acoustic features of speech units (such as phonemes) based on the training data. The language model models word order as found in the training data.

When the speech signal is received for speech recognition, acoustic features are extracted from the speech signal and compared against the models in the acoustic model to identify speech units contained in the speech signal. Potential words are compared against the language model to determine the probability that a word was spoken, given its history (or context).

It is often desirable to design speech recognizers so that they may be used with computer systems with less processing power and/or less memory capabilities without losing speech recognition accuracy. One significant memory intensive portion of a speech recognition system is the storing of the acoustic model. In a Hidden Markov Model (HMM) based speech recognition system, the acoustic model commonly consists of tens of thousands of multi-dimensional gaussian probability distributions with diagonal covariance matrices. For example, the gaussian distributions can each be 33 dimensions. Each dimension requires a mean and a variance. Therefore, if a model has 40,000 gaussians of 33 dimensions, each having a mean and a variance, which is typically stored as a four byte floating point value, the acoustic model would take over ten megabytes to store.

Storing each mean with a byte and each variance with a byte can be done with scalar quantization and often results in no degradation in error rate and a factor of 4 compression (the model in the example above would be 2.5 MB). One such type of scalar quantization is linear scalar quantization, which can be done by finding the maximum and minimum value of each parameter and linearly quantizing the points in between.

Known clustering techniques can be used to compress the acoustic model so that it takes less memory to store. Generally, this technique is referred to as subspace coding and involves grouping different components together Typically, the representative gaussian distributions are stored in a codebook for each dimension. The codebooks are stored to form the acoustic model and accessed during speech recognition to process an input signal. In view that representative gaussians are used, some accuracy will be lost for the benefit of a smaller acoustic model. The further the model is compressed, the more accuracy will be degraded. Current techniques use Euclidean distance which significantly reduce accuracy as soon as more than one component is grouped together.

An improved method for compressing gaussian distributions, while maintaining improved accuracy, is always beneficial. A smaller yet more accurate model is particularly beneficial to speech recognition; however, other applications may also yield improved performance.

SUMMARY OF THE INVENTION

The present invention provides a method for compressing multiple dimensional gaussian distributions with diagonal covariance matrices that includes clustering a plurality of gaussian distributions in a multiplicity of clusters for each dimension. Each cluster can be represented by a centroid having a mean and a variance. A total decrease in likelihood of a training dataset is minimized for the representation of the plurality of gaussian distributions. In the embodiment illustrated, a metric having a mathematical measure of closeness is minimized and used to assign gaussian distributions. Whereas a Euclidean measure is often used in sub-space coding, a non-Euclidean measure can provide a better indication of closeness between a centroid and a gaussian distribution.

In a further embodiment where K Gaussians of dimension D and diagonal covariance matrices are provided, gaussian k can be represented with a mean vector $m_k = (m_k[1], m_k[2], \ldots, m_k[D])$ and variance vector $\upsilon_k = (\upsilon_k[1], \upsilon_k[2], \ldots \upsilon_k[D])$. The mean and variance of each centroid can be formed of weighted averages of the Gaussians that belong to that cluster. A codebook $C_d$ is provided for each dimension D, $\{B_1, B, \ldots, B_D\}$, where each codeword vector n in codebook $B_d$ is a two-dimensional vector $(\mu_n[d], \sigma_n[d])$ containing a mean and a variance. A mean of each centroid can be calculated using an equation of a form:

$$\mu_n[d] = \frac{\sum_{k \in V_n} C_k m_k[d]}{\sum_{k \in V_n} C_k},$$

while a variance of each centroid can be calculated using a equation of a form:

$$\sigma_n^2[d] = \frac{\sum_{k \in V_n} C_k \left[ (\upsilon_k[d])^2 + (m_k[d] - \mu_n[d])^2 \right]}{\sum_{k \in V_n} C_k},$$

wherein $C_k$ is the "counts" of Gaussian k as seen in training, and $V_n$ is the plurality of Gaussians that are in cluster n. Individual gaussians can be assigned to clusters using a measure of closeness of a form:

$$S_d(k, n) = 2 \ln \sigma_n[d] + \frac{\upsilon_k^2[d]}{\sigma_n^2[d]} + \frac{(m_k[d] - \mu_n[d])^2}{\sigma_n^2[d]}.$$

BRIEF DESCRIPTION OF THE DRAWINGS

FIG. 6 is two-dimensional array of combinations of total measures of closeness for 33 dimensions.

DETAILED DESCRIPTION OF ILLUSTRATIVE EMBODIMENTS

One aspect of the present invention relates to forming subspace coded gaussian models of smaller size and improved accuracy. However, prior to discussing this and other aspects in detail, a description of one exemplary computing environment and computer-implemented application in which the present invention can be used will be provided.

Figure 1:
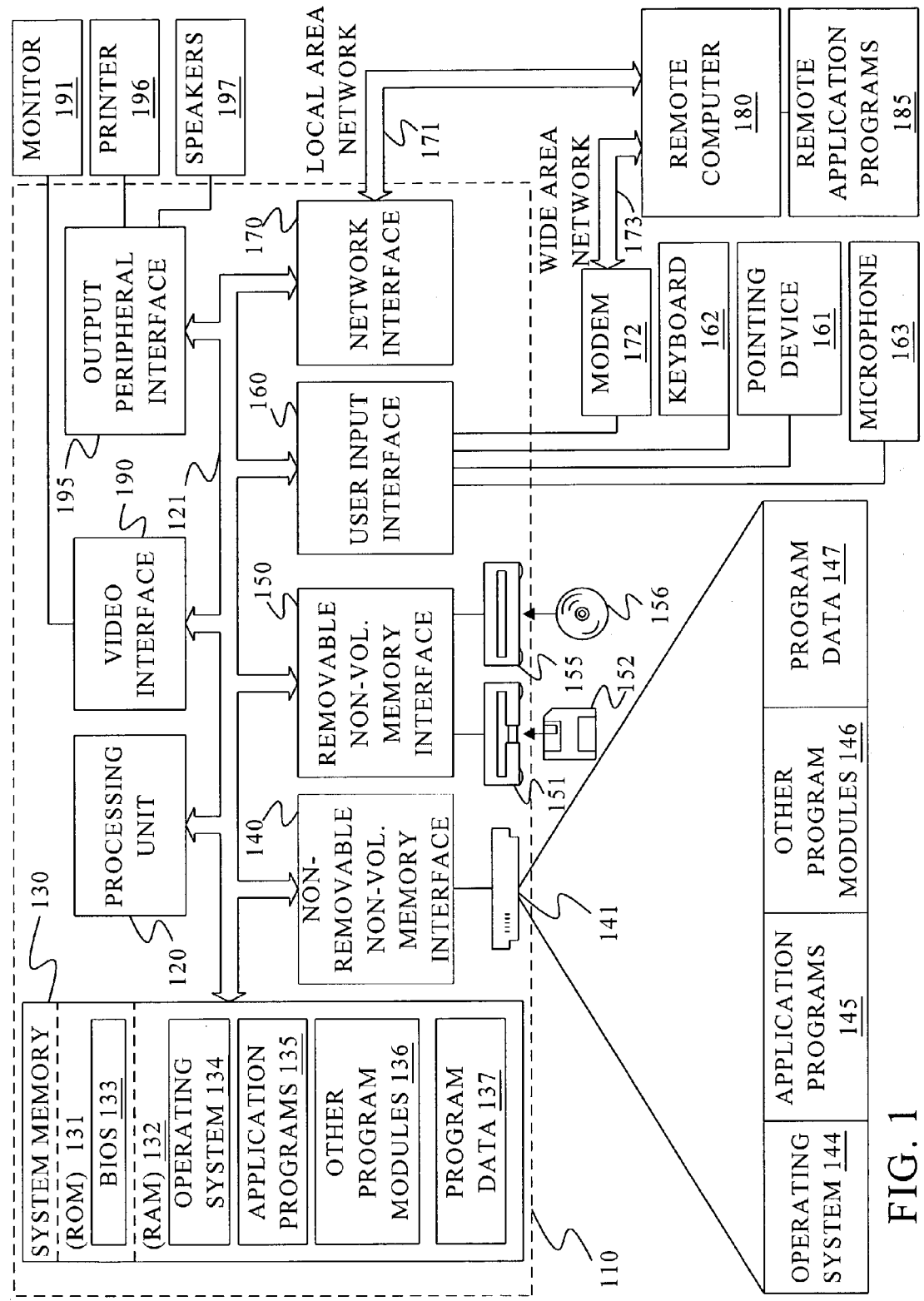
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
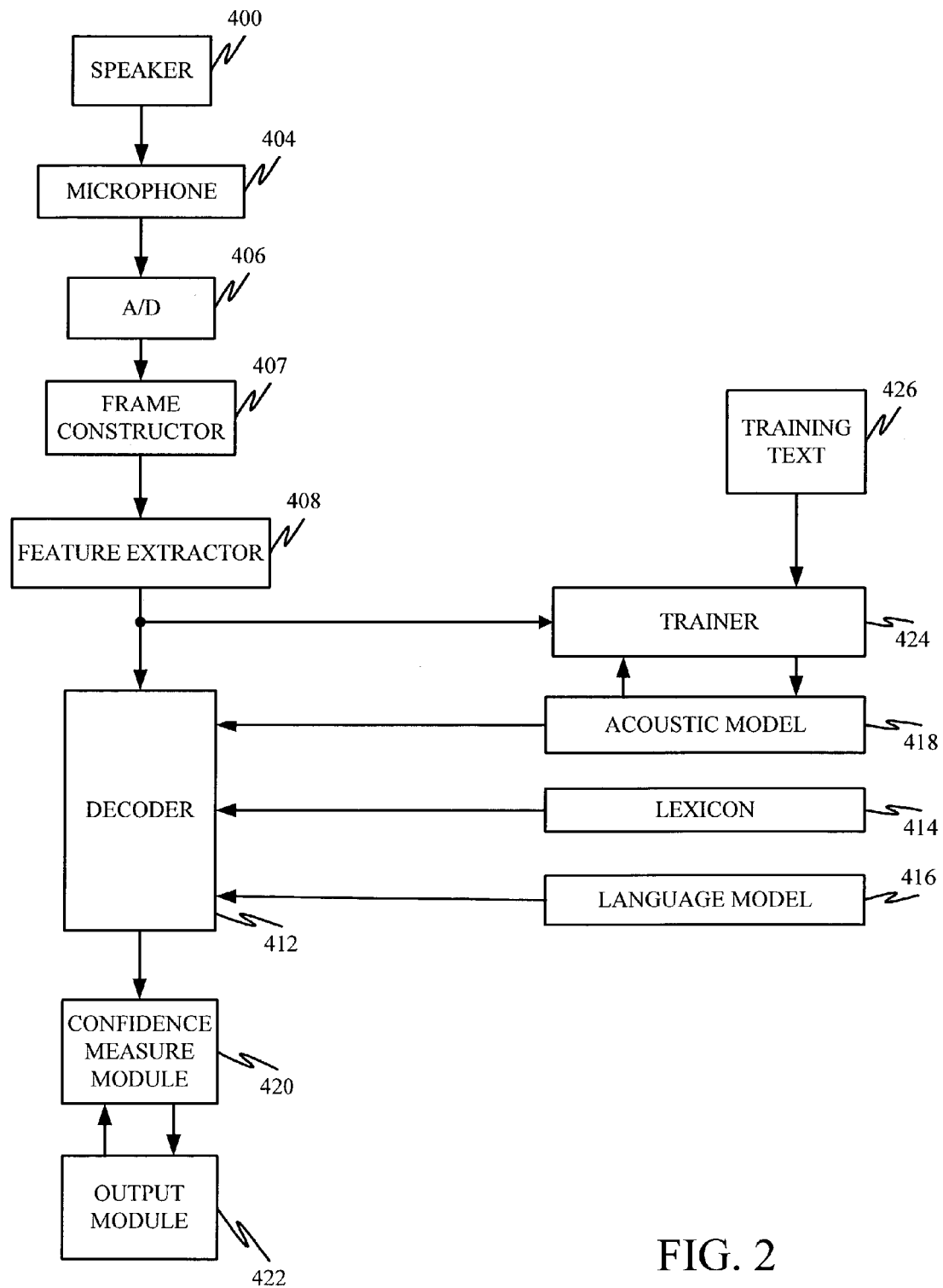
FIG. 2 is a block diagram of a speech recognition system in accordance with one embodiment of the present invention.

FIG. 2 illustrates a block diagram of an exemplary speech recognition system having an acoustic model benefiting from subspace coding of gaussian distributions of the present invention. Although particularly beneficial for forming a compressed and accurate acoustic model for speech recognition, thereby comprising one aspect of the present invention, the techniques described below for forming the compressed model can be used in other applications.

In FIG. 2, a speaker 400 speaks into a microphone 404. The audio signals detected by microphone 404 are converted into electrical signals that are provided to analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 408 produces a stream of feature vectors that are each associated with a frame of the speech signal. This stream of feature vectors is provided to a decoder 412, which identifies a most likely sequence of words based on the stream of feature vectors, a lexicon 414, a language model 416 (for example, based on an N-gram, context-free grammars, or hybrids thereof), and the acoustic model 418. The particular method used for decoding is not important to the present invention. However, aspects of the present invention include modifications to the acoustic model 418 and the use thereof.

The most probable sequence of hypothesis words can be provided to an optional confidence measure module 420. Confidence measure module 420 identifies which words are most likely to have been improperly identified by the speech recognizer. This can be based in part on a secondary acoustic model (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

During training, a speech signal corresponding to training text 426 is input to decoder 412, along with a lexical transcription of the training text 426. Trainer 424 trains acoustic model 418 based on the training inputs. An aspect of the present invention includes forming a compressed acoustic model 418 with improved accuracy.

Figure 3A:
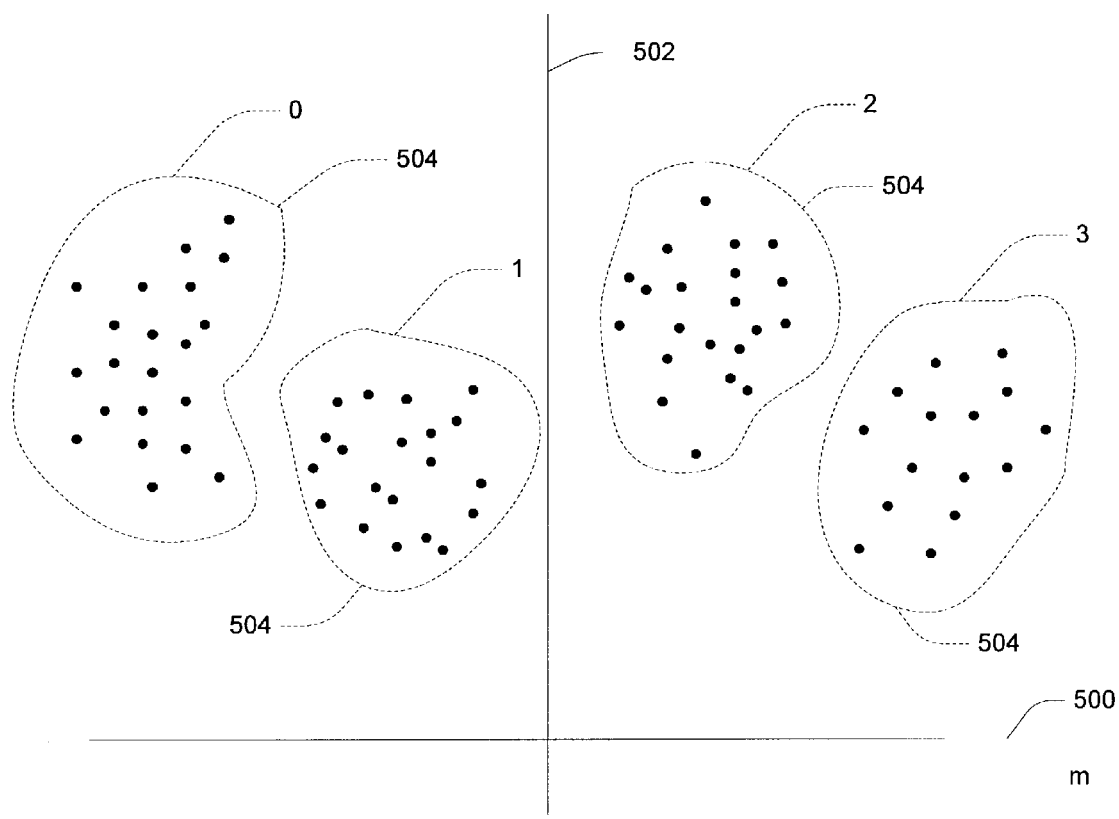
FIG. 3A is a plot of gaussian distributions formed in clusters.

Before describing the subspace grouping or clustering technique of the present invention, it may be helpful to review a prior coding technique used for the acoustic model 418. As discussed in the background section, a typical acoustic model is formed from and represents tens of thousands of multidimensional gaussian probability distributions. For instance, a common acoustic model includes many 33 dimensional diagonal gaussian probability distributions. In this embodiment, each gaussian has 33 means ("m") and 33 variances ("v"), one for each dimension. Rather than maintaining all of the gaussian distributions, the gaussian distributions are clustered or grouped in a manner so as to yield representative gaussian distributions, also referred to herein as "centroids". FIG. 3A schematically illustrates partial clustering for one dimension. In FIG. 3A, each of the points represent a gaussian distribution having a mean and a variance, wherein in FIG. 3A mean values are referenced to a horizontal axis 500, while variance values are referenced relative to a vertical axis 502. Clustering involves grouping similar gaussian distributions together, which is represented in FIG. 3A as dashed circles 504. In FIG. 3A, four clusters are illustrated and denoted as "zero", "one", "two", and "three".

Figure 3B:
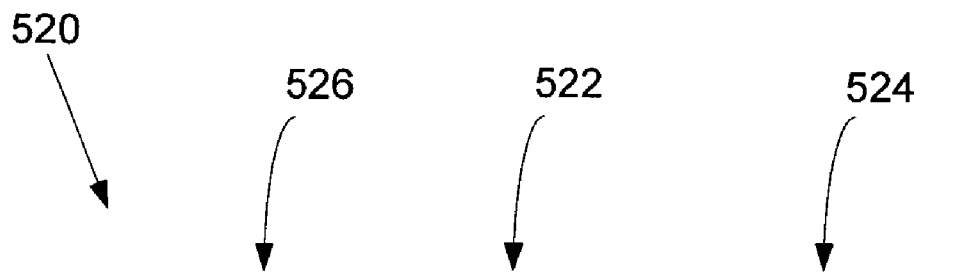
FIG. 3B is a schematic diagram of a codebook having means and variances for one dimension.

As described above, a centroid is obtained to represent the cluster of gaussian distributions. Each centroid thus includes a corresponding mean and variance. One coding technique includes representing each centroid (each mean and each variance) with a single number, which can then be used to reference, and thereby, obtain the mean and variance values. This technique is a simple form of subspace quantization and involves forming a codebook 520, schematically illustrated in FIG. 3B, which can be for purposes of the present invention a collection of centroids, or means or variances thereof separately. As described above, each centroid has a corresponding mean and variance which are stored in the codebook as columns 522 and 524, respectively. A third column 526 comprises a reference identifier, which corresponds to the clusters formed in the plot of FIG. 3. A codebook can have any number of entries (codewords), for example, 0 to 15 (16 entries), or 0 to 255 (256 entries). The plot of FIG. 3A represents the first four clusters and corresponding centroids. It should be noted one could also code each mean and each variance separately.

The codebook 520 stores the mean and variance used during processing, referenced to the third column 526. For example, if a gaussian mean is represented by the number 2, the codebook would indicate the mean of 1.40374 should be used, whereas if a gaussian variance is represented by the number 3, the codebook would indicate that the value of 0.0053 for the variance should be used.

Figure 3C:
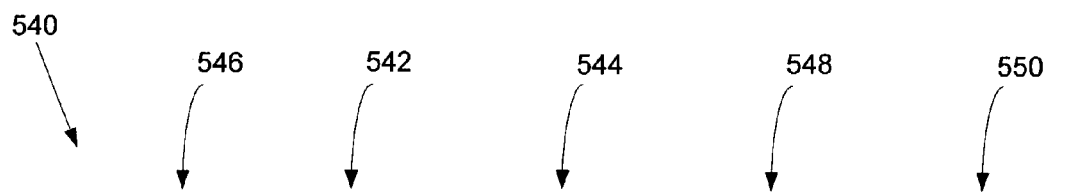
FIG. 3C is a schematic diagram of a codebook having means and variances for two dimension.

To further reduce the size of the acoustic model, a technique of subspace coding can be used. For subspace coding, several dimensions are represented together. For example, it may be possible to group dimensions 1 and 2 together and represent the corresponding means and variances with a signal number from 0-255 in a manner similar to that described above with one dimension. FIG. 3C illustrates a codebook 540 where dimensions 1 and 3 are grouped together, columns 542 and 544 represent the mean and variance for dimension 1, while columns 548 and 550 represent the mean and variance for dimension 3 all of which referenced to an identifier 546. By grouping two dimensions together, the model can be reduced by approximately a factor of two. This technique is referred to as subspace coding because the original model may have a 33 dimensional space, while the reduced model would have a 17 dimensional space (16 dimensions grouped together in pairs with one remaining on its own), which is a subspace of the original 33 dimensional space. It should also be noted that a further reduction by a factor of two is achieved by using a codebook such as illustrated in FIG. 3C where a single number of column 546 represents two means and two variances.

Aspects of the present invention include estimating each codebook independently in such a way that the total likelihood of the training data used in the HMM decreases the least. Generally, this includes calculating a mean and a variance for each centroid to represent a plurality of gaussian distributions wherein a total decrease in likelihood is minimized for the representation of the plurality of gaussian distributions. In the illustrative embodiment, gaussian distributions are clustered using a metric having a mathematical measure of closeness to assign gaussian distributions, wherein the metric is minimized. Other aspects include new calculations for obtaining a centroid for each cluster and a new measure for clustering and subspace coding.

In a system with K Gaussians of dimension D and diagonal covariance matrices, Gaussian k can be represented with a mean vector $m_k = (m_k[1], m_k[2], \ldots, m_k[D])$ and variance vector $v_k = (v_k[1], v_k[2], \ldots, v_k[D])$.

With a system architecture consisting of D codebooks $\{B_1, B_2, \ldots, B_D\}$ containing $N = 2^l$ codeword vectors each, then each codeword vector n in codebook $C_d$ is a two-dimensional vector $(\mu_n[d], \sigma_n[d])$ containing a mean and a variance.

The following provides codebook estimation. Each codebook is estimated independently in such a way that the total likelihood of the training data used in the HMM decreases the least. The contribution to the total log-likelihood of dimension d for Gaussian k is given by $$L_k[d] = -\sum_{t=1}^{T} \xi_t(k) \left[ \frac{1}{2} \ln(2\pi) + \ln v_k[d] + \frac{(x_t[d] - m_k[d])^2}{2 v_k^2[d]} \right]$$

$$= -\frac{C_k \ln(2\pi)}{2} - C_k \ln v_k[d] - \frac{1}{2 v_k^2[d]} \sum_{t=1}^{T} \xi_t(k)(x_t[d] - m_k[d])^2$$

$$= -\frac{C_k \ln(2\pi)}{2} - C_k \ln v_k[d] - \frac{C_k}{2}$$

where $\xi_1(k)$ is the posterior probability of vector $x_1$ being in Gaussian k as obtained through the Baum-Welch algorithm, and $$C_k = \sum_{t=1}^{T} \xi_t(k)$$

is the "counts" of Gaussian k as seen in training.

With $(m_k[d], v_k[d])$ by $(\mu_n[d], \sigma_n[d])$ quantized, the new (lower) likelihood will be given by $$L'_k[d] = -\frac{C_k \ln(2\pi)}{2} - C_k \ln \sigma_n[d] - \frac{1}{2 \sigma_n^2[d]} \sum_{t=1}^{T} \xi_t(k)(x_t[d] - \mu_n[d])^2$$

$$= -\frac{C_k \ln(2\pi)}{2} - C_k \ln \sigma_n[d] -$$

$$\frac{1}{2 \sigma_n^2[d]} \sum_{t=1}^{T} \xi_t(k)((x_t[d] - m_k[d]) + (m_k[d] - \mu_n[d]))^2$$

$$= -\frac{C_k \ln(2\pi)}{2} - C_k \ln \sigma_n[d] -$$

$$\frac{1}{2 \sigma_n^2[d]} \sum_{t=1}^{T} \xi_t(k)((x_t[d] - m_k[d])^2 + (m_k[d] - \mu_n[d])^2)$$

$$= -\frac{C_k \ln(2\pi)}{2} - C_k \ln \sigma_n[d] - \frac{C_k v_k^2[d]}{2 \sigma_n^2[d]} - \frac{C_k (m_k[d] - \mu_n[d])^2}{2 \sigma_n^2[d]}$$

so that the decrease in likelihood is given by $$L_k[d] - L'_k[d] = -\frac{C_k}{2} - C_k \ln v_k[d] + C_k \ln \sigma_n[d] +$$

$$\frac{C_k v_k^2[d]}{2 \sigma_n^2[d]} + \frac{C_k (m_k[d] - \mu_n[d])^2}{2 \sigma_n^2[d]}$$

$$= -\frac{C_k}{2} - C_k \ln v_k[d] + \frac{C_k}{2} S_d(k, n)$$

where $S_d(k,n)$, defined as the measure of closeness between Gaussian k and codeword n for dimension d, is given by $$S_d(k,n) = 2\ln\sigma_n[d] + \frac{v_k^2[d]}{\sigma_n^2[d]} + \frac{(m_k[d] - \mu_n[d])^2}{\sigma_n^2[d]} \qquad \text{EQ. 1}$$

The one-dimensional Gaussian $(m_k[d], v_k[d])$ is then quantized to $(\mu_n[d], \sigma_n[d])$ by choosing n that minimizes such measure $$n = \arg\min_l S_d(k, l)$$

In order to estimate $\mu_n[d]$ and $\sigma_n[d]$, the total decrease in likelihood is minimized $$\sum_{k=1}^{K}(L_k[d] - L'_k[d]) = -\frac{1}{2}\sum_{k=1}^{K}C_k - \sum_{k=1}^{K}C_k \ln v_k[d] + \frac{1}{2}\sum_{k=1}^{K}C_k \min_n S_d(k,n)$$

which can be obtained by taking the derivative and equating to 0:

$$\mu_n[d] = \frac{\sum_{k \in V_n} C_k m_k[d]}{\sum_{k \in V_n} C_k} \qquad \text{EQ. 2}$$

$$\sigma_n^2[d] = \frac{\sum_{k \in V_n} C_k[(v_k[d])^2 + (m_k[d] - \mu_n[d])^2]}{\sum_{k \in V_n} C_k} \qquad \text{EQ. 3}$$

where $V_n$ is the set of Gaussians that are in cluster n.

These equations can be extended to multiple dimensions by summing $S_d(k,n)$ in equation 1 across multiple dimensions d. Equations 2 and 3 remain the same.

It is important to note that the "optimal" centroid of a cluster is not the arithmetic average as in traditional VQ (vector quantization), but rather some weighted averages as indicated by equations 2 and 3. In addition, the "optimal" distance measure (EQ. 1) is not Euclidean.

Stated another way, equations 2 and 3 differ from the standard derivation in that the averages are weighted by the number of occurrences of each gaussian in training (i.e., the number of training vectors that matched that gaussian), and in addition there is a correction factor that increases the variance estimate corresponding to the error in quantizing the gaussian means. Instead of equation 1, a Euclidean distance comprising the square of the difference of the means (vector mean and cluster centroid mean) plus the square of the difference of the variances (vector variance and cluster centroid variance) would be used. However, the Euclidean distance does not attempt to minimize the total decrease in likelihood.

In short, equations 2 and 3 provide the mean and variance values for a given centroid, while equation 1 is used to ascertain the gaussian distributions for each cluster.

Figure 4:
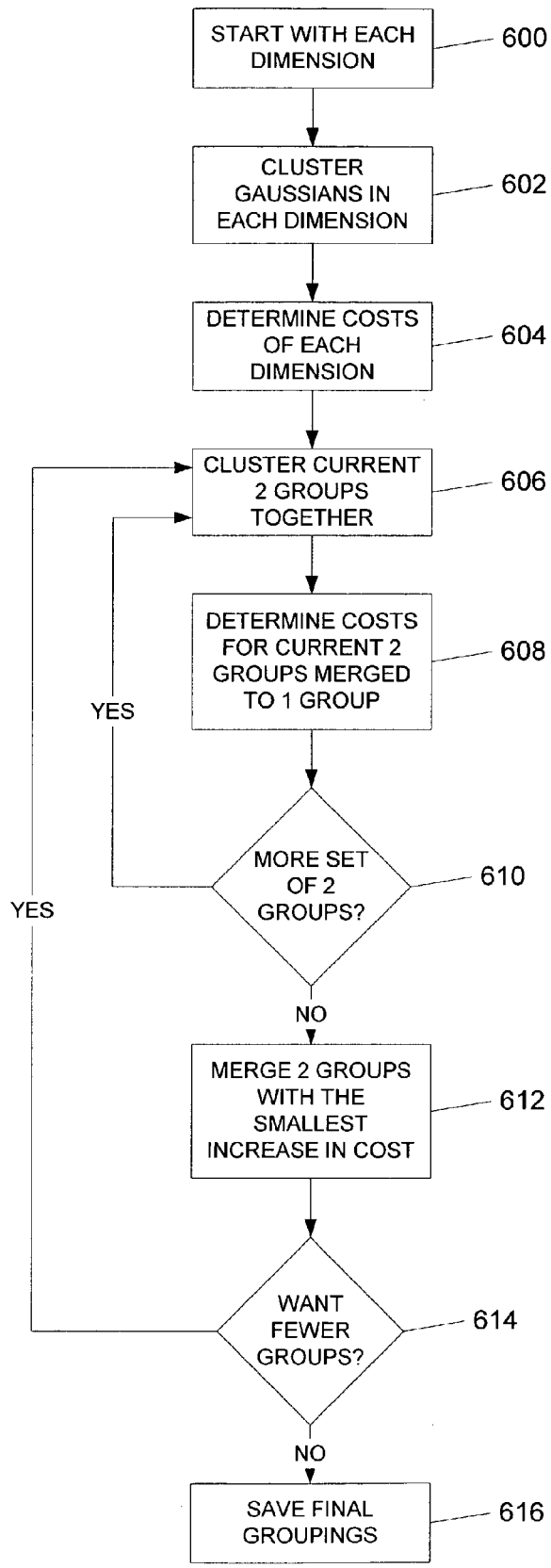
FIG. 4 is a flow chart illustrating a method of clustering and subspace coding.

FIG. 4 illustrates steps for performing clustering and also steps for performing subspace coding or grouping. The method begins at step 600. At step 602, the gaussian distributions of each dimension are clustered into a selected number of clusters with each cluster having a representative or calculated centroid. As stated above, equations 2 and 3 calculate elements of the centroid, while equation 1 is a measure for determining which gaussian distribution belongs with which cluster. There are various well known standard techniques for clustering. Generally, one must determine how to initialize the clusters, and then, how to add clusters, if one did not initially begin with the desired number of clusters. K-means clustering can be used at this step. For example, one method includes starting with only one cluster containing all of the gaussian distributions, and then periodically split all the clusters until the desired number of clusters is reached. Alternatively, one can begin with the desired number of clusters and then assign probability distributions equally among the initial clusters.

Figure 5:
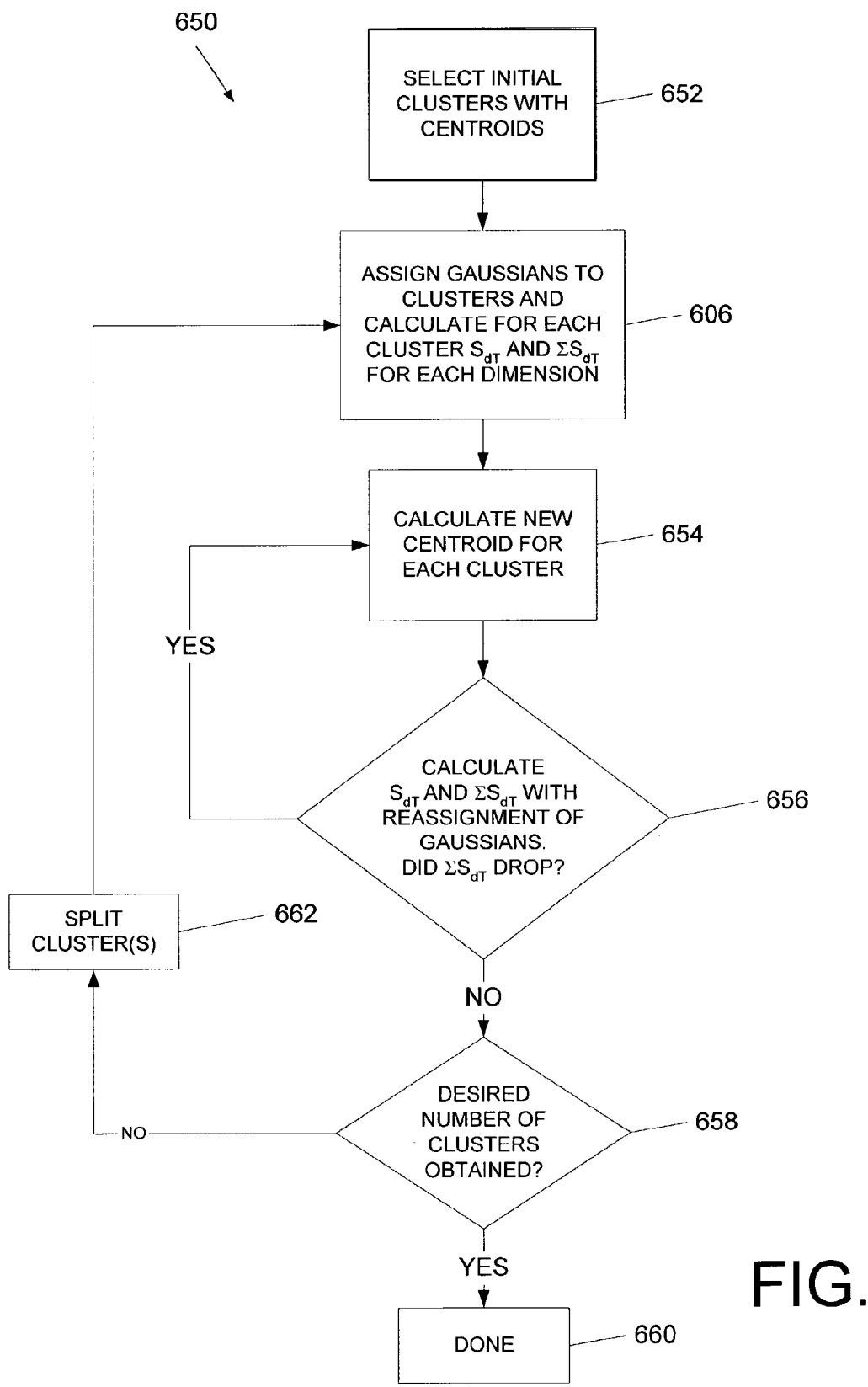
FIG. 5 is a flow chart illustrating a method of clustering with more detail.

FIG. 5 illustrates a suitable method 650 for clustering. At step 652, the initial clusters are determined (either one, some or the total desired number). At this step, a centroid is chosen to represent each cluster.

At step 654, using equation 1, probability distributions are assigned to the clusters. In particular, each Gaussian distribution is compared to each centroid, and is assigned to that cluster if it is the "closest" as determined by the measure of equation 1. A total measure $S_{dT}$ for each cluster is also calculated by summing the individual measures for each gaussian to the centroid for all the gaussians assigned to the corresponding cluster. In addition, the total dimension measure $\Sigma S_{dT}$ comprising the sum of all of the individual total measures of each cluster is also calculated.

At step 656, a new centroid is calculated for each cluster using equations 2 and 3 in view of the gaussians that were assigned to the corresponding cluster at step 654.

With new centroids calculated, the gaussian distributions can be once again compared to the new centroids to see if any should be reassigned at step 658. Essentially, this involves repeating the calculations of step 654, and if the total dimension measure for all the clusters drops significantly (i.e. below a selected threshold) due to reassignment of the gaussian distributions, the algorithm returns to step 656. However, if the total dimension measure does not drop significantly, the method continues to step 660.

At step 660, if the number of clusters present equals the desired number of clusters, clustering is complete, otherwise, some or all of the clusters are split in two at step 662 and the method returns to step 654.

Besides forming clusters based on only the gaussian distributions of one dimension (steps 602 and 604), the same technique can be applied to each combination or permutation for the set of dimensions (e.g., dimension 0 and dimension 1, dimension 0 and dimension 2, dimension 0 and dimension 3, etc.). Steps 606 and 608 in FIG. 4 represent the steps of the clustering and the cost determination method of FIG. 5 for combinations of dimensions. At this stage, a group is comprised of two dimensions. At step 610, the process is repeated until all the various combinations have been calculated. Pictorially, this can be represented as in FIG. 6 where a two-dimensional array represents the total dimension measures for each combination of dimensions. In particular, the diagonal elements ($\Sigma S_{dT\,0,0}$) correspond to the clustering and cost determinations for a single dimension (i.e. steps 602 and 604), while the off-diagonal elements ($\Sigma S_{dT\,0,2}$) correspond to clustering and cost determination for merging two dimensions.

At step 612, the two dimensions with the smallest increase in cost are grouped together. The smallest increase in cost is determined by the following formula.

Cost of Merging=Cost[*A&B*]−Cost[*A*]−Cost[*B*]Group *A* & Group *B*    5 wherein the first iteration, A and B represent a single dimension (e.g. 0, 1, 2, etc.); however, in later iterations A and B may also represent already merged dimensions (e.g. 1 and 26, 2 and 13, etc.).

Referring back to FIG. 6, in the first iteration, Cost[A & B] is one of the off-diagonal elements, while Cost[A] and Cost [B] are each obtained from the diagonal elements.

Having merged two dimensions together at step 612, the total number of dimensions has been reduced by 1 (e.g. from 33 dimensions to 32 dimensions).

If the desired reduction in dimensions has not been reached at step 614, the process returns to step 606 where clustering and cost determinations are calculated based on the newly formed group with respect to each of the other dimensions. Pictorially, this can be represented as a two dimensional array, reduced by one row and one column (i.e. 32 by 32), where a new diagonal element represents the cost of the newly formed group and the off-diagonal elements have been augmented to reflect various combinations with the other dimensions. Once again, at step 608, the two groups with the smallest increase in cost are merged based on calculation of equation 1 above. Further iterations of steps 606, 608, 610, 612 and 614 are repeated until the desired number of dimensions has been achieved through grouping of the original dimensions. Subspace coding is complete at step 616.

Figure 7E:
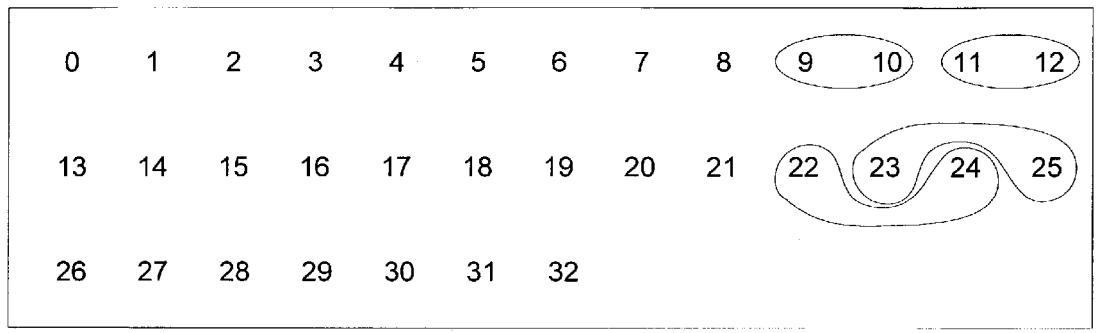
FIG. 7A-7T illustrate an exemplary series of steps showing subspace coding of 33 dimensions.
Figure 7F:
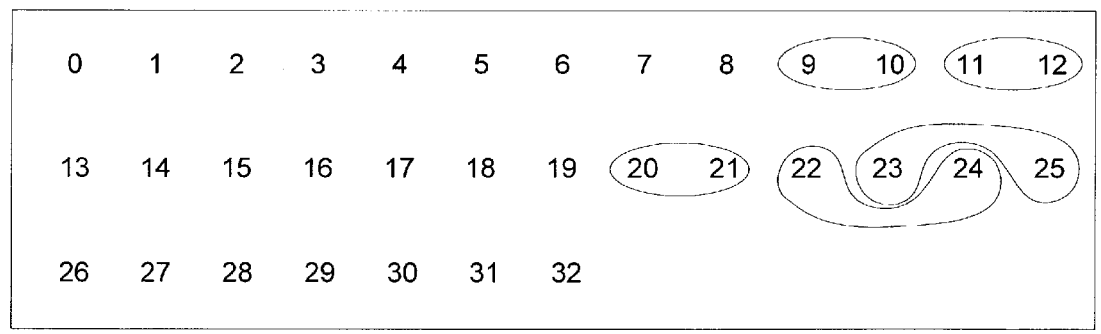
Figure 7G:
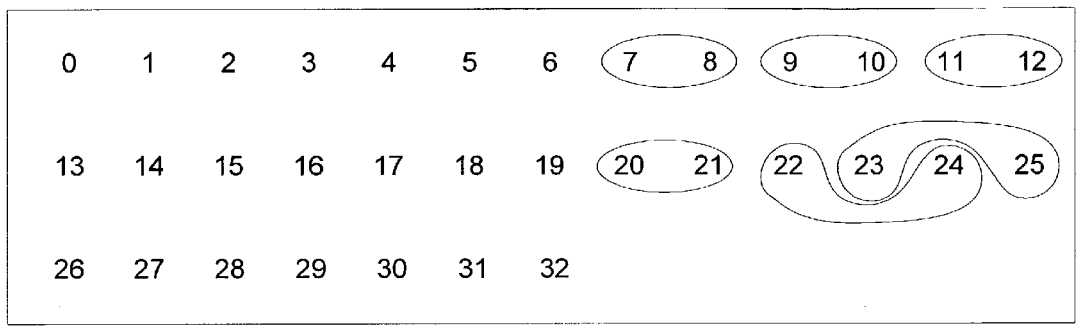
Figure 7H:
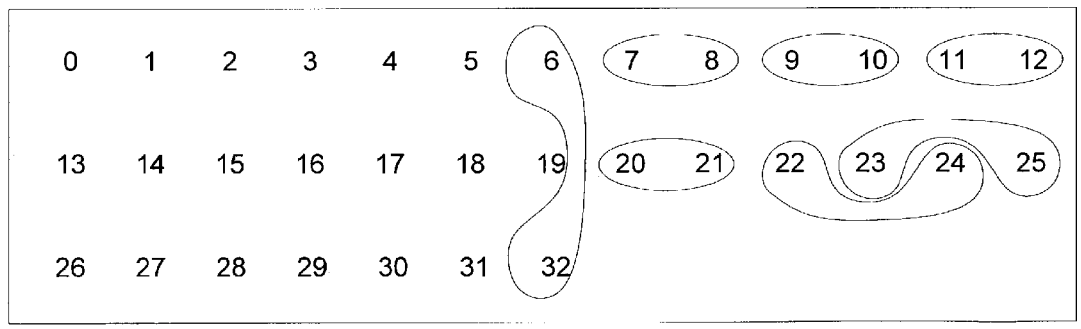
Figure 7I:
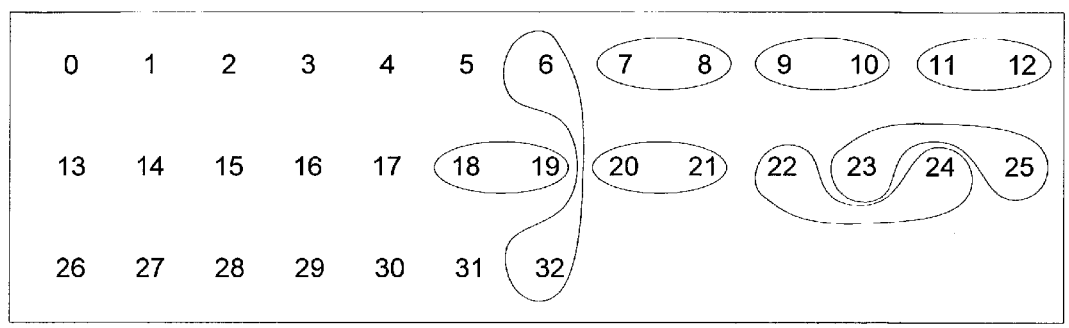
Figure 7J:
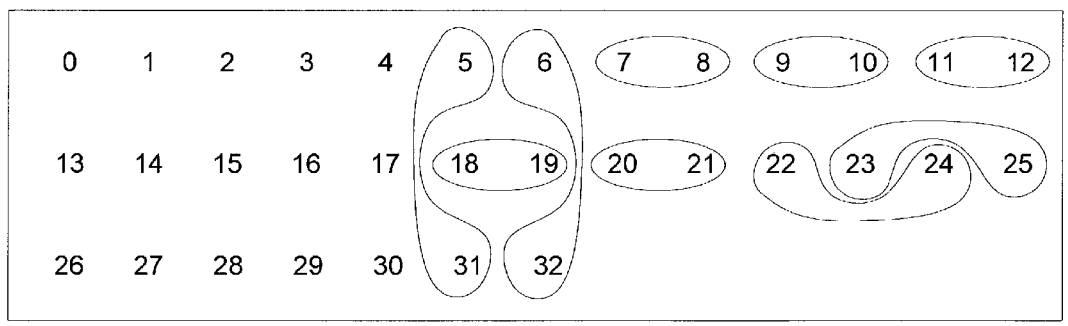
Figure 7K:
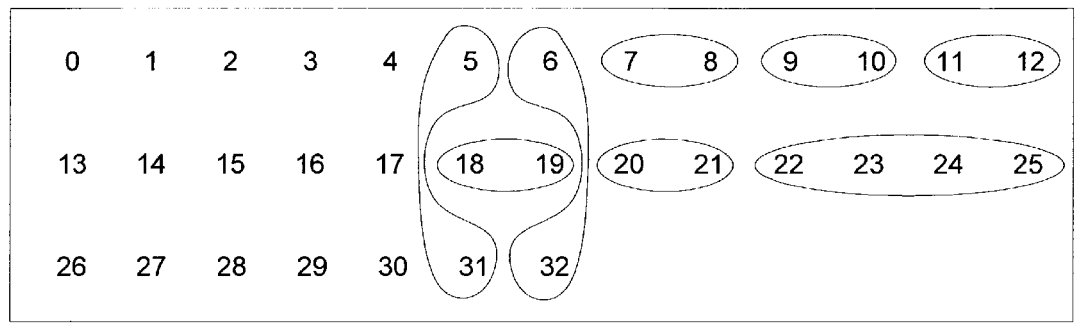
Figure 7L:
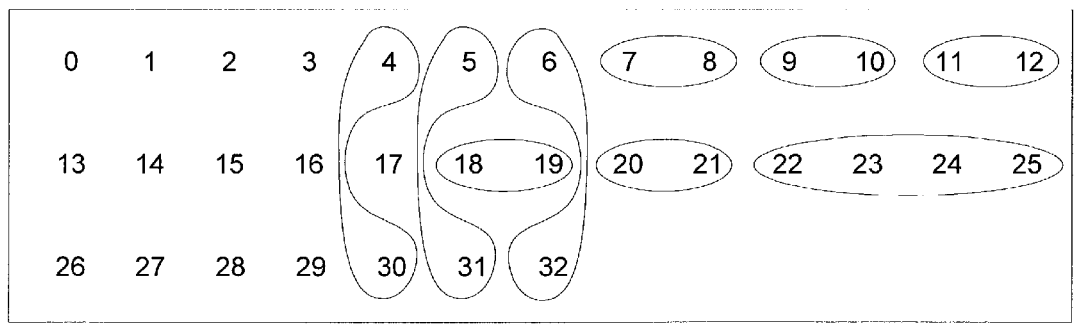
Figure 7M:
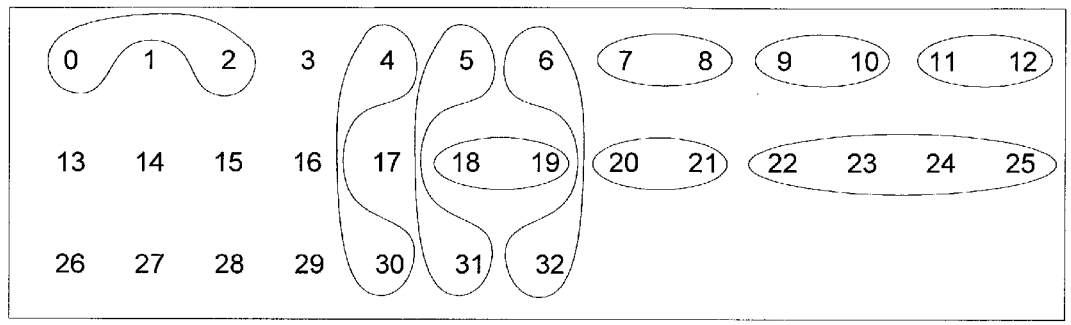
Figure 7N:
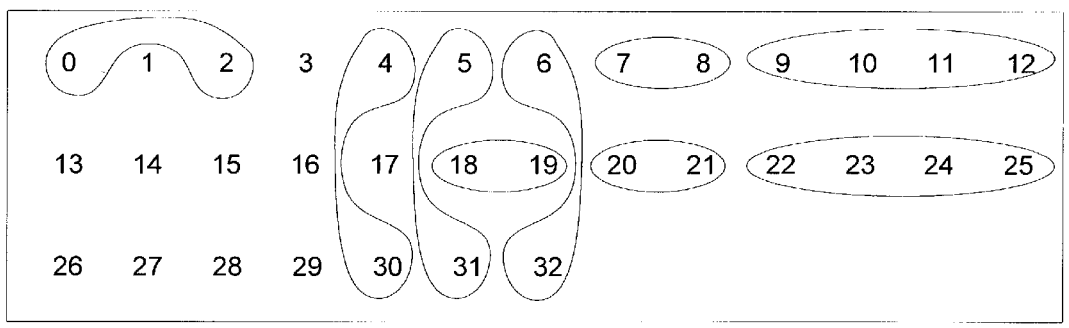
Figure 7O:
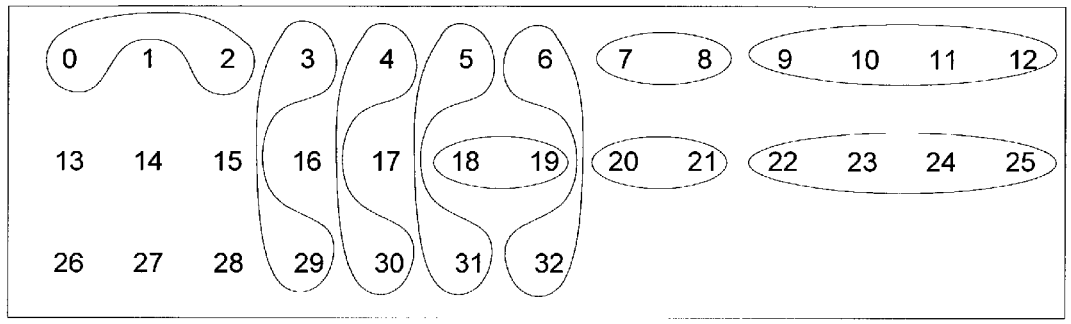
Figure 7P:
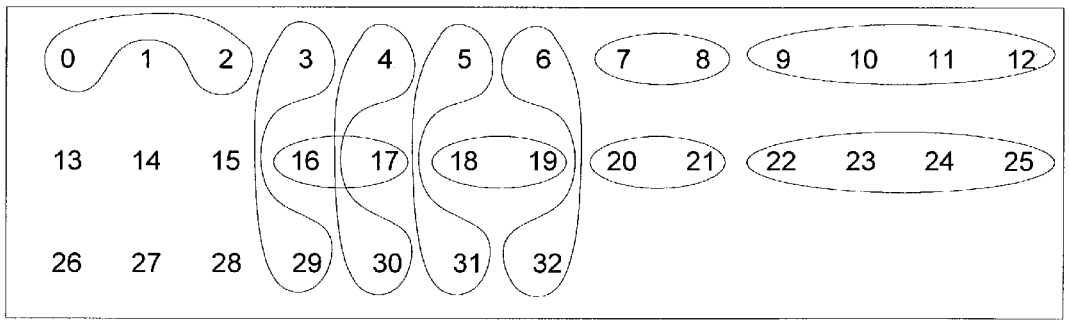
Figure 7Q:
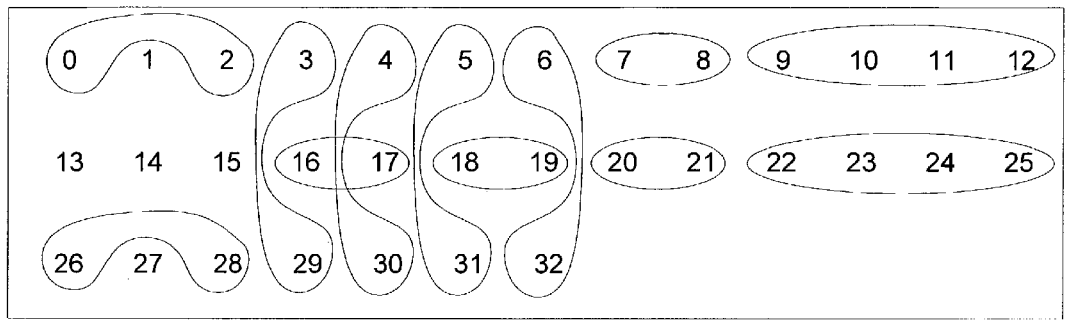
Figure 7R:
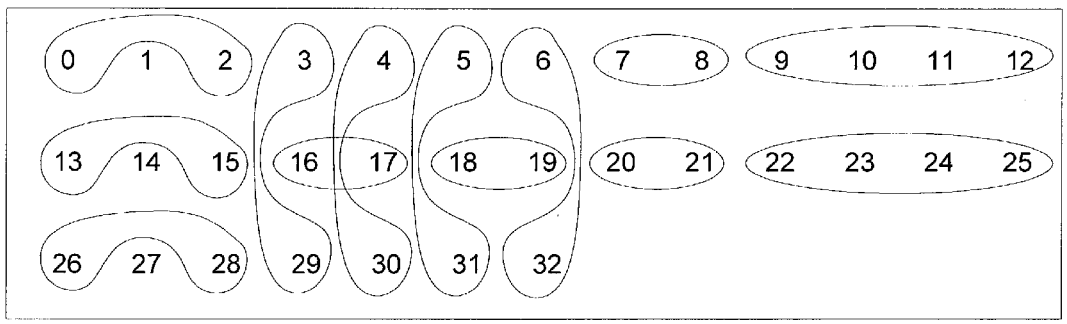
Figure 7S:
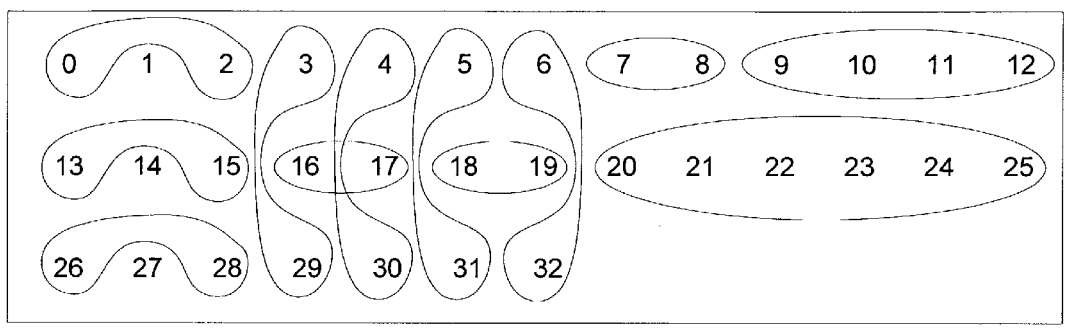
Figure 7T:
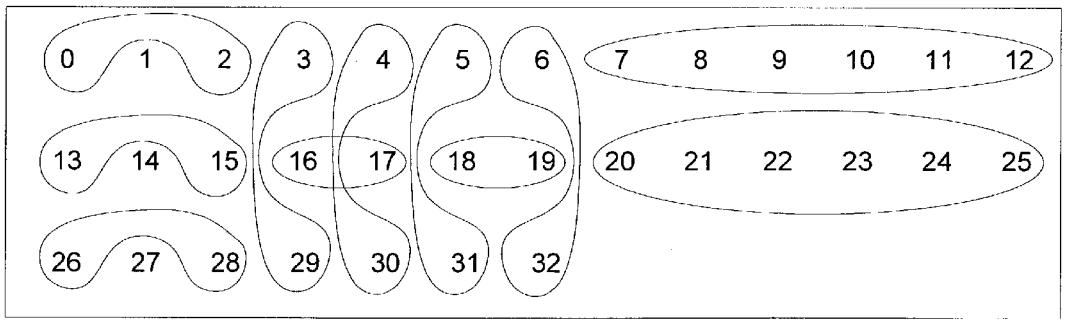

FIGS. 7A-7T illustrate pictorially how the reduction in dimensions can occur. In FIG. 7A, each dimension is listed and this state corresponds to the original dimensions (e.g. 33 dimensions) and just prior to merging at step 612 in FIG. 4.

FIG. 7B illustrates where two dimensions, dimension 23 and dimension 25, have been chosen based on the smallest increase in cost at step 612. Similarly, FIGS. 7C-7J illustrate further iterations through steps 606, 608, 610, 612 of FIG. 4 where groupings are formed based on two of the original dimensions.

FIG. 7K illustrates where two prior formed groups have been formed into a larger group. Similarly, FIG. 7N illustrate yet another iteration where two prior groups are formed in a larger group.

FIG. 7T illustrates completion of the final iteration when the subspace coding has yielded 14 dimensions from the original 33 dimensions.

In a speech recognition system, the codebooks are stored as part of the acoustic model 418 and used during speech recognition; however, the storage and use of codebooks do not form part of the present invention. Briefly, a codebook is generated for each subspace dimension. Returning back to the original acoustic model comprising thousands of multidimensional gaussians, the best clusters for each subspace dimension is found for each gaussian distribution. A new compressed acoustic model is based on subspace representations.

Although the present invention has been described with reference to particular embodiments, workers skilled in the art will recognize that changes may be made in form and detail without departing from the spirit and scope of the invention.

What is claimed is:

1. A computer-implemented method for compressing multidimensional gaussian distributions with diagonal covariance matrices, the method comprising:

with a computer, clustering a plurality of gaussian distributions in a multiplicity of clusters for each dimension, wherein each cluster is represented by a centroid, and wherein each centroid and each gaussian distribution includes a mean and a variance, and wherein clustering includes:

calculating a mean for each centroid as a weighted average of the means of the plurality of gaussian distributions forming the cluster, the weighted average being based on a number of vectors that are matched to a gaussian in the plurality of gaussian distributions; and calculating a variance for each centroid as function of a weighted average of the variances of the plurality of gaussian distributions forming the cluster, the weighted average being based on a number of vectors that are matched to a gaussian in the plurality of gaussian distributions, and wherein a correction factor is included in calculating each variance, wherein the correction factor increases the variance corresponding to an error in quantizing the means; and providing an output from the computer indicative of the clustered gaussian distributions;

wherein calculating a mean of each centroid includes using an equation of a form:

$$\mu_n[d] = \frac{\sum_{k \in V_n} C_k m_k[d]}{\sum_{k \in V_n} C_k},$$

and wherein calculating a variance of each centroid includes using a equation of a form:

$$\sigma_n^2[d] = \frac{\sum_{k \in V_n} C_k \left[ (\upsilon_k[d])^2 + (m_k[d] - \mu_n[d])^2 \right]}{\sum_{k \in V_n} C_k},$$

wherein $C_k$ is the "counts" of Gaussian k as seen in training, and $V_n$ is the plurality of Gaussians that are in cluster n.

2. The method of claim 1 wherein clustering further includes assigning gaussian distributions to a cluster as a function of a non-Euclidean measure that provides an indication of closeness between a centroid and a gaussian distribution.

3. The method of claim 1 wherein K Gaussians of dimension D and diagonal covariance matrices are provided, wherein gaussian k can be represented with a mean vector $m_k = (m_k[1], m_k[2], \ldots, m_k[D])$ and variance vector $\upsilon_k = (\upsilon_k[1], \upsilon_k[2], \ldots, \upsilon_k[D])$, and wherein the output comprises a codebook $B_d$ provided for each dimension D, $\{B_1, B_2, \ldots, B_D\}$, and wherein each codeword vector n in codebook $B_d$ is a two-dimensional vector $(\mu_n[d], \sigma_n[d])$ containing a mean and a variance, and wherein assigning includes using a measure of closeness of a form:

$$S_d(k, n) = 2\ln\sigma_n[d] + \frac{v_k^2[d]}{\sigma_n^2[d]} + \frac{(m_k[d] - \mu_n[d])^2}{\sigma_n^2[d]}.$$

4. The method of claim 1 wherein assigning includes repetitively calculating mean and variance values for centroids for each cluster and assigning gaussian distributions as a function of the measure until a decrease in the sum of all measures across all clusters is below a selected threshold.

5. The method of claim 1 wherein clustering includes k-means clustering.

6. The method of claim 5 and further comprising grouping dimensions together.

7. The method of claim 6 wherein grouping comprises calculating a measure of closeness for all permutations of two dimensions and selecting dimensions to group to form a set of grouped dimensions as a function of increasing values of the measure of closeness in order to minimize the decrease in likelihood of a training set.

8. The method of claim 7 wherein grouping comprises calculating a measure of closeness for all permutations of sets of grouped dimensions and dimensions and selecting from dimensions and sets of grouped dimensions those to group as a function of increasing values of the measure of closeness in order to minimize the decrease in likelihood of a training set.

9. A computer readable storage media having instructions for compressing multidimensional gaussian distributions with diagonal covariance matrices, the computer readable media comprising:

a module for clustering a plurality of gaussian distributions in a multiplicity of clusters for each dimension, wherein each cluster is represented by a centroid, and wherein each centroid and each gaussian distribution includes a mean and a variance, and wherein the module calculates a mean for each centroid as function of a weighted average of the means of the plurality of gaussian distributions forming the cluster; wherein the module calculates a variance for each centroid as function of a weighted average of the variances of the plurality of gaussian distributions forming the cluster; wherein K Gaussians of dimension D and diagonal covariance matrices are processed, wherein gaussian k can be represented with a mean vector $m_k=(m_k[1],m_k[2],\ldots,m_k[D])$ and variance vector $v_k=(v_k[1],v_k[2],\ldots,v_k[D])$, and wherein the module assigns gaussians using a measure of closeness of a form:

$$S_d(k, n) = 2\ln\sigma_n[d] + \frac{v_k^2[d]}{\sigma_n^2[d]} + \frac{(m_k[d] - \mu_n[d])^2}{\sigma_n^2[d]};$$

and wherein the module is configured to store information indicative of the clustered gaussian distributions.

10. The computer readable storage media of claim 9 wherein the module assigns gaussian distributions to a cluster as a function of a non-Euclidean measure that provides an indication of closeness between a centroid and a gaussian distribution.

11. The computer readable storage media of claim 10 wherein the information comprises a codebook $B_d$ provided for each dimension D, $\{B_1,B_2,\ldots,B_D\}$, and wherein each codeword vector n in codebook $B_d$ is a two-dimensional vector $(\mu_n[d],\sigma_n[d])$ containing a mean and a variance.

12. The computer readable storage media of claim 11 wherein a variance of each centroid includes a correction factor corresponding to an error in quantizing the means.

13. The computer readable storage media of claim 11 wherein a mean of each centroid is calculated using an equation of a form:

$$\mu_n[d] = \frac{\sum_{k \in V_n} C_k m_k[d]}{\sum_{k \in V_n} C_k},$$

and wherein a variance of each centroid is calculated using a equation of a form:

$$\sigma_n^2[d] = \frac{\sum_{k \in V_n} C_k\left[(v_k[d])^2 + (m_k[d] - \mu_n[d])^2\right]}{\sum_{k \in V_n} C_k},$$

wherein $C_k$ is the "counts" of Gaussian k as seen in training, and $V_n$ is the plurality of Gaussians that are in cluster n.

14. The computer readable storage media of claim 13 wherein the module assigns gaussians by repetitively calculating mean and variance values for centroids for each cluster and assigning gaussian distributions as a function of the measure until a decrease in the sum of all measures across all clusters is below a selected threshold.

15. The computer readable storage media of claim 13 wherein clustering includes k-means clustering.

16. The computer readable storage media of claim 15 and wherein the module groups dimensions together.

17. The computer readable storage media of claim 16 wherein the module groups dimensions together to form a set of grouped dimensions by calculating a measure of closeness for all permutations of two dimensions and selecting dimensions to group as a function of increasing values of the measure of closeness in order to minimize the decrease in likelihood of a training set.

18. The computer readable storage media of claim 17 wherein the module groups dimensions and/or sets of grouped dimensions together by calculating a measure of closeness for all permutations of sets of grouped dimensions and dimensions and selecting those dimensions and sets of grouped dimensions to group as a function of increasing values of the measure of closeness in order to minimize the decrease in likelihood of a training set.

19. A computer-implemented method for compressing multidimensional gaussian distributions with diagonal covariance matrices, the method comprising:

with a computer, clustering a plurality of gaussian distributions in a multiplicity of clusters based on combinations of at least two different dimensions with each other into a merged dimension and wherein each cluster is represented by a centroid, and wherein each centroid and each gaussian distribution includes a mean and a variance, and wherein clustering includes:

calculating a mean and a variance for each centroid to represent a plurality of gaussian distributions wherein a total decrease in likelihood of a training dataset is minimized for the representation of the plurality of gaussian distributions;

assigning gaussian distributions to a cluster in a manner that the total decrease in likelihood is minimized, wherein assigning includes using and minimizing a metric having a mathematical measure of closeness to assign gaussian distributions, wherein K Gaussians of dimension D and diagonal covariance matrices are provided, wherein gaussian k can be represented with a mean vector $m_k=(m_k[1],m_k[2],\ldots,m_k[D])$ and variance vector $\upsilon_k=(\upsilon_k[1],\upsilon_k[2],\ldots\upsilon_k[D])$, and wherein the information comprises a codebook $B_d$ provided for each dimension D, $\{B_1, B_2, \ldots, B_D\}$, and wherein each codeword vector n in codebook $B_d$ is a two-dimensional vector $(\mu_n[d], \sigma_n[d])$ containing a mean and a variance, and wherein assigning includes using the mathematical measure of closeness of a form:

$$S_d(k,n) = 2\ln\sigma_n[d] + \frac{\upsilon_k^2[d]}{\sigma_n^2[d]} + \frac{(m_k[d]-\mu_n[d])^2}{\sigma_n^2[d]};$$

and storing information indicative of the clustered gaussian distributions.

20. The method of claim 19 wherein calculating a variance of each centroid includes a correction factor corresponding to an error in quantizing the means.

21. The method of claim 20 wherein calculating a mean and a variance includes:
calculating a mean for each centroid as a weighted average of the means of the plurality of gaussian distributions forming the cluster; and
calculating a variance for each centroid as function of a weighted average of the variances of the plurality of gaussian distributions forming the cluster.

22. The method of claim 20 wherein calculating a mean of each centroid includes using an equation of a form:

$$\mu_n[d] = \frac{\sum_{k \in V_n} C_k m_k[d]}{\sum_{k \in V_n} C_k},$$

and wherein calculating a variance of each centroid includes using a equation of a form:

$$\sigma_n^2[d] = \frac{\sum_{k \in V_n} C_k\left[(\upsilon_k[d])^2 + (m_k[d]-\mu_n[d])^2\right]}{\sum_{k \in V_n} C_k},$$

wherein $C_k$ is the "counts" of Gaussian k as seen in training, and $V_n$ is the plurality of Gaussians that are in cluster n.

23. The method of claim 22 wherein assigning includes repetitively calculating mean and variance values for centroids for each cluster and assigning gaussian distributions as a function of the measure until a decrease in the sum of all measures across all clusters is below a selected threshold.

24. The method of claim 23 and further comprising grouping dimensions together.

25. The method of claim 24 wherein grouping comprises calculating a measure of closeness for all permutations of two dimensions and selecting dimensions to group to form a set of grouped dimensions as a function of increasing values of the measure of closeness in order to minimize the decrease in likelihood of a training set.

26. The method of claim 25 wherein grouping comprises calculating a measure of closeness for all permutations of sets of grouped dimensions and dimensions and selecting from dimensions and sets of grouped dimensions those to group as a function of increasing values of the measure of closeness in order to minimize the decrease in likelihood of a training set.

27. A computer readable storage media having instructions for compressing multidimensional gaussian distributions with diagonal covariance matrices, the computer readable media comprising:
a module for clustering a plurality of gaussian distributions in a multiplicity of clusters for each dimension, wherein each cluster is represented by a centroid, and wherein each centroid and each gaussian distribution includes a mean and a variance, and wherein the module calculates a mean and a variance for each centroid to represent a plurality of gaussian distributions wherein a total decrease in likelihood of a training dataset is minimized for the representation of the plurality of gaussian distributions and wherein the module is configured to cluster based on merging at least two different dimensions with each other into a merged dimension, wherein the module assigns gaussian distributions to a cluster in a manner that the total decrease in likelihood is minimized, wherein the module assigns gaussian distributions by using and minimizing a metric having a mathematical measure of closeness to assign gaussian distributions, wherein K Gaussians of dimension D and diagonal covariance matrices are provided, wherein gaussian k can be represented with a mean vector $m_k=(m_k[1],m_k[2],\ldots,m_k[D])$ and variance vector $\upsilon_k=(\upsilon_k[1],\upsilon_k[2],\ldots\upsilon_k[D])$, and wherein the information comprises a codebook $B_d$ provided for each dimension D, $\{B_1, B_2, \ldots, B_D\}$, and wherein each codeword vector n in codebook $B_d$ is a two-dimensional vector $(\mu_n[d], \sigma_n[d])$ containing a mean and a variance, and wherein the module assigns gaussians using a measure of closeness of a form:

$$S_d(k,n) = 2\ln\sigma_n[d] + \frac{\upsilon_k^2[d]}{\sigma_n^2[d]} + \frac{(m_k[d]-\mu_n[d])^2}{\sigma_n^2[d]};$$

and wherein the module is configured to store information indicative of the clustered gaussian distributions.

28. The computer readable storage media of claim 27 wherein a variance of each centroid includes a correction factor corresponding to an error in quantizing the means.

29. The computer readable storage media of claim 28 wherein a mean for each centroid is calculated as a weighted average of the means of the plurality of gaussian distributions forming the cluster, a variance for each centroid is calculated as function of a weighted average of the variances of the plurality of gaussian distributions forming the cluster.

30. The computer readable storage media of claim 27 wherein a mean of each centroid is calculated using an equation of a form:

$$\mu_n[d] = \frac{\sum_{k \in V_n} C_k m_k[d]}{\sum_{k \in V_n} C_k},$$

and wherein a variance of each centroid is calculated using a equation of a form:

$$\sigma_n^2[d] = \frac{\sum_{k \in V_n} C_k [(v_k[d])^2 + (m_k[d] - \mu_n[d])^2]}{\sum_{k \in V_n} C_k};$$

wherein $C_k$ is the "counts" of Gaussian k as seen in training, and $V_n$ is the plurality of Gaussians that are in cluster n.

31. The computer readable storage media of claim 30 wherein the module assigns gaussians by repetitively calculating mean and variance values for centroids for each cluster and assigning gaussian distributions as a function of the measure until a decrease in the sum of all measures across all clusters is below a selected threshold.

32. The computer readable storage media of claim 31 and wherein the module groups dimensions together.

33. The computer readable storage media of claim 32 wherein the module groups dimensions together to form a set of grouped dimensions by calculating a measure of closeness for all permutations of two dimensions and selecting dimensions to group as a function of increasing values of the measure of closeness in order to minimize the decrease in likelihood of a training set.

34. The computer readable storage media of claim 33 wherein the module groups dimensions and/or sets of grouped dimensions together by calculating a measure of closeness for all permutations of sets of grouped dimensions and dimensions and selecting those dimensions and sets of grouped dimensions to group as a function of increasing values of the measure of closeness in order to minimize the decrease in likelihood of a training set.

* * * * *